United States Patent

Miller et al.

[11] Patent Number: 5,889,340
[45] Date of Patent: Mar. 30, 1999

[54] ELONGATE STATOR FOR A LINEAR MOTOR AND BUNDLE OF LAMINATIONS FOR PRODUCING SAID ELONGATE STATOR

[75] Inventors: Luitpold Miller, Ottobrum; Wolfgang Hahn, Kassel, both of Germany

[73] Assignee: Thyssen Industrie AG, Essen, Germany

[21] Appl. No.: 875,150
[22] PCT Filed: Oct. 19, 1996
[86] PCT No.: PCT/DE96/02008
§ 371 Date: Oct. 21, 1997
§ 102(e) Date: Oct. 21, 1997
[87] PCT Pub. No.: WO97/16880
PCT Pub. Date: May 9, 1997

[30] Foreign Application Priority Data

Oct. 30, 1995 [DE] Germany .................. 195 40 442.4
May 20, 1996 [DE] Germany .................. 196 20 221.3

[51] Int. Cl.[6] .................................................. H02K 41/00
[52] U.S. Cl. ............................... 310/12; 24/530; 336/208
[58] Field of Search .............................. 310/43, 45, 153, 310/179, 180, 12, 13, 14; 336/20, 83, 98, 196, 205, 208, 209, 210; 24/530, 531, 542, 543, 564

[56] References Cited

U.S. PATENT DOCUMENTS 4,975,672 12/1990 McLyman .......................... 336/198
5,263,671 11/1993 Baum ................................. 248/68.1

Primary Examiner—Nestor Ramirez
Assistant Examiner—Judson H. Jones
Attorney, Agent, or Firm—Michael J. Striker

[57] ABSTRACT

The invention concerns an elongate stator for a linear motor with grooves and elastically deformable electrical leads which are secured therein. The groove walls are open towards the exterior by means of slots which, at their narrowest point, are narrower than the outer diameter of the leads. Owing to their elastic deformability, the leads can be pushed through the slots into the grooves and secured therein.

11 Claims, 3 Drawing Sheets

ELONGATE STATOR FOR A LINEAR MOTOR AND BUNDLE OF LAMINATIONS FOR PRODUCING SAID ELONGATE STATOR

BACKGROUND OF THE INVENTION

The invention relates to an elongate stator for an linear motor and to a bundle of laminations intended for producing it.

Linear motors for electric drive mechanisms have long been known. A known linear motor, intended for driving a magnetic levitation or maglev railway for rapid intercity transit, for instance, contains an elongate stator secured to the travel way, which comprises many slotted bundles of laminations place one behind the other and a three-phase alternating current-traveling-wave winding inserted into the slots thereof.

The lines in the individual winding turns of the traveling wave winding are mechanically fixedly joined together in prefabrication and are then placed in the slots of the elongate stator or inductor (German Patent DE 30 06 382 C2). The mechanically fixed connection can be accomplished by means of clamps, which hold together the lines of the end turns of the windings and at the same time make an electrical connection of the line sheath with a ground conductor that is extended along the inductor past the end turns of the windings.

For mechanically fixing the position of the lines in the slots of the elongate stator, mounts extended over the length of the slots are used, for instance in the form of half-shells (German Patent Disclosure DE 33 09 051), which comprise injection-molded plastic parts and have laterally protruding resilient arms, which are braced, in the finally mounted state, on corresponding bearing shoulders formed in the slot walls. As a result, on the one hand complicated and expensive tools are needed to produce the mounts, as well as extra work steps for mounting the mounts during installation of the windings. On the other, the bracing of the mounts on the bearing shoulders means that a very thin corrosion protection layer applied to the bundle of laminations (German Patent DE 31 10 339 C2) will gradually tear or burst at the bracing points, creating opportunities for rust to form. Besides, the mounts become brittle over time, and as a result the snap connections formed by the resilient arms age and break. Elongate stators of this kind are therefore not as weatherproof as would be needed for use in rapid transit systems or the like. Because of the unavoidable play of the mounts in the slots, clattering noises ensue whenever something passes over them, unfavorably affecting total sound emissions.

SUMMARY OF THE INVENTION

It is therefore the object of the invention to propose a means that is suitable for simplified yet economical positional fixation of the lines in the slots of the elongate stator and at the same time reliably precludes corrosion.

The invention has the advantage that no additional components are required for the positional fixation of the lines in the slots of the elongate stator, and the lines are retained in the slots by positive or nonpositive engagement. As a result, on the one hand rapid, simple mounting of the lines is assured, and on the other, since only the outer sheets of the lines come into contact with the slot walls, undesirable wear of the corrosion protection layer of the stator bundle is avoided entirely.

The object is described in further detail below in conjunction with the accompanying drawing in terms of preferred exemplary embodiments.

DESCRIPTION OF THE PREFERRED EMBODIMENTS

Figure 1:
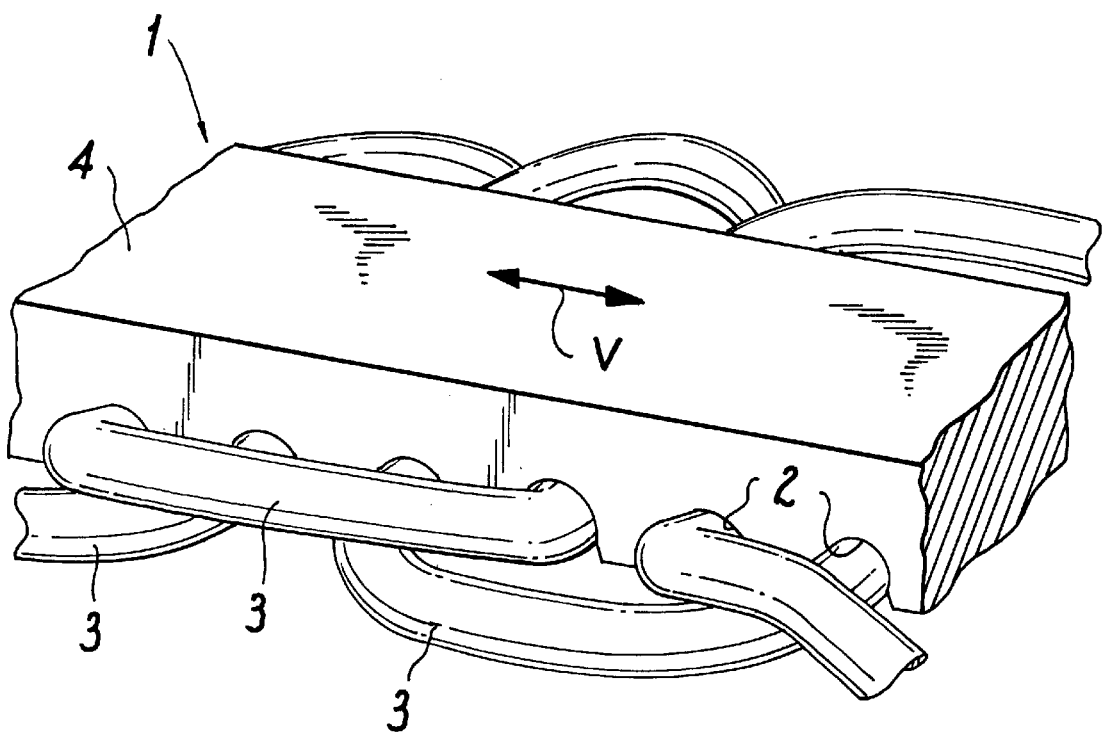
FIG. 1, in a schematic, perspective view, the elongate stator of a linear motor having a three-phase alternating current winding.

FIG. 1 shows a portion of an elongate stator 1 of a linear motor. At predetermined intervals, the elongate stator 1 has slots 2, which extend crosswise to its longitudinal direction (arrow V) and in which the turns, substantially comprising electrical lines 3, of a three-phase alternating current winding are located. In the exemplary embodiment, a reaction part, not shown, is guided longitudinally along the underside of the elongate stator 1; in a known manner, this part is built into a vehicle, such as a maglev vehicle, and is formed by load-bearing magnets which form a gap with the elongate stator 1 and at the same time furnish the exciter field for the linear motor.

Figure 2:
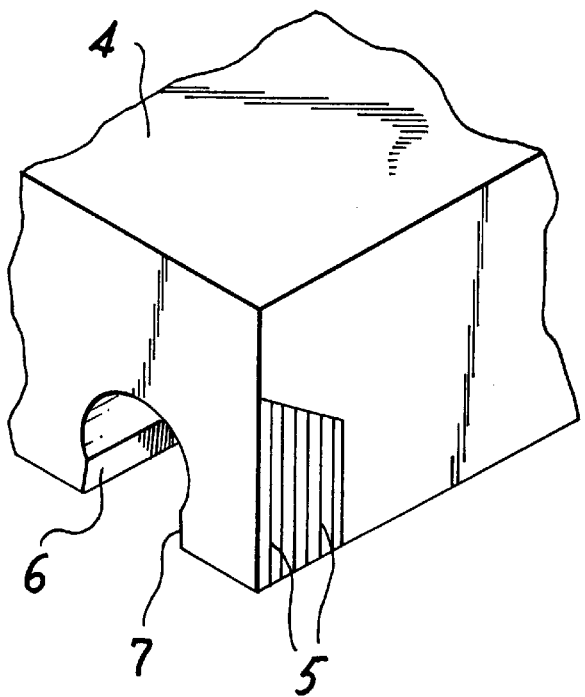
FIG. 2, a perspective view of a small portion of the elongate stator, containing only a single slot, in which the form of the slot wall has been made by punching.

The elongate stator 1 is also composed of many bundles 4 of laminations (FIG. 1), which for instance are 1 to 2 m in length and of which in FIG. 2 a small portion, having only one slot 2, is shown. The bundles 4 of laminations comprise individual sheet-metal laminations 5, indicated roughly schematically in FIG. 2; each lamination 5 has a number of portions, expediently shaped identically, and the portions of the individual laminations 5 are as a rule aligned with one another, forming the slots 2 of the finished bundle 4 of laminations.

The general construction and mode of operation of a linear motor having this kind of elongate stator 1 are well-known to one skilled in the art, for instance from German Patent 33 03 961, which to avoid repetition is incorporated by reference in the subject of the present disclosure.

Figure 3:
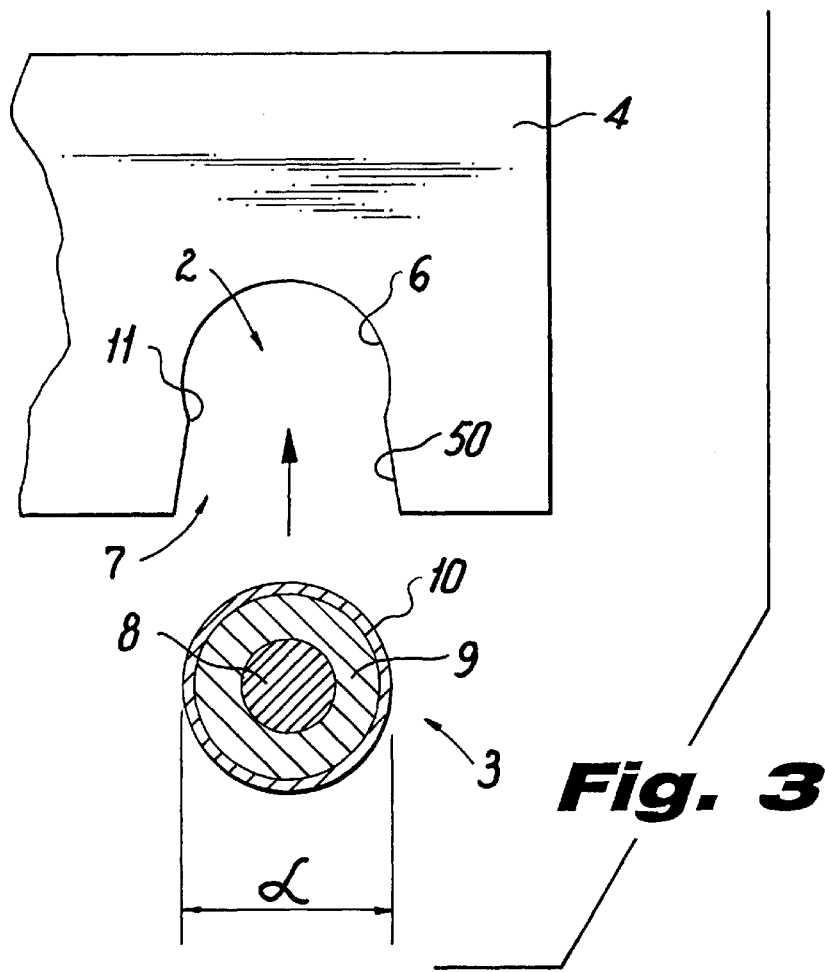
FIGS. 3 and 4, one front view each of the slot of FIG. 2, respectively before and after an electric line has been placed in it.
Figure 4:
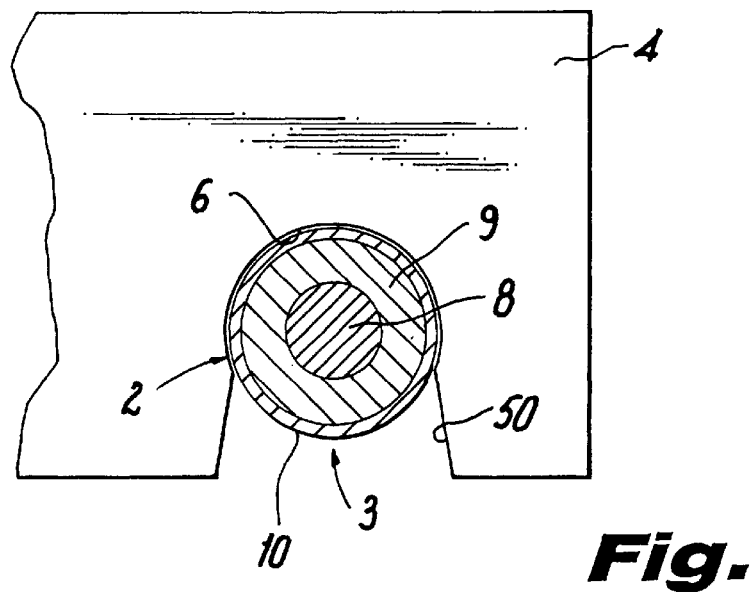

In FIGS. 2–4, the slots 2 are each provided with walls 6, which according to the invention are opened to the outside through slits 7, which at their narrowest point have a width less than the outer diameter d of the lines 3, which as a rule have circular cross sections. It is assumed here that the lines 3 are radially elastically deformable in a manner known per se. This is a consequence of the fact that the lines 3 typically have at least one multi-wire, electrically conductive core 8, one middle high-voltage insulator layer 9, and one outer, electrically conductive sheath 10, which is connected to a ground conductor. The insulating layer 9 comprises an ethylene-propylene rubber, for instance, while the sheath 10 may be made from a chloroprene rubber. Both substances are elastically resilient within certain limits.

The positional fixation of the lines 3 in the slots 2 is effected by pressing them through the slits 7 into the slots 2 from the outside, in the direction of the arrow shown in FIG. 3, causing their elastic deformation, whereupon as a result of an elastic expansion of the line material they lock in detent fashion behind the slits 7 and are then prevented by them from falling out of the slots 2 (FIG. 4). According to the invention, the lines 3 are retained in the slots 2 in the manner of snap connections by a combination of positive and nonpositive engagement. No further means for fixing the lines 3 in the slots 2 are required. If needed, the properties of the material from which the lines 3 are made should be selected such that the desired detent action is obtained without damage to the lines 3 as they are inserted into the slots 2. It must also be assured that the elasticity of the lines 3 not be so great that after being placed in the slots 2 they could fall out of them again because of vibration occurring during operation of the rapid intercity transit system or the like.

In the one practical embodiment, for a line 3 of conventional construction and an outer diameter of approximately 38.9 mm, a width of the slit 7 at its narrowest point of approximately 33 mm has proved to be usable.

In the particularly preferred embodiment shown in FIGS. 2–4 for the slot cross section, the load-bearing regions of the slot wall 6, in this case the lower regions, are provided with bearing faces 11 (FIG. 3) that are adapted to the cylindrical cross-sectional form of the lines 3, extend as far as the slits 7, and each extend over circumferential angles of between 0° and 90°. As a result, large-area support for the lines 3 is obtained, so that undesired wear of the corrosion protection layers and/or line sheaths cannot occur during operation. Such wear can, however, be avoided even more effectively by providing that the slot walls 6 are also adapted to the line cross sections in the upper, non-load-bearing, regions adjoining the bearing faces 11 and extending over 180°. The line 3, after locking in place in detent fashion, into the inner portion of the slot 2 bounded on the outside by the narrowest points of the slit 7, is then positively surrounded over an angle of less than 360° but more than 180°, so that during operation it cannot execute any undesirable oscillating motions.

In the exemplary embodiment of FIGS. 2–4, the final form of the slot wall 6 is essentially produced by punching and is changed only insignificantly by the thin corrosion protection layer that is applied afterward.

Figure 5:
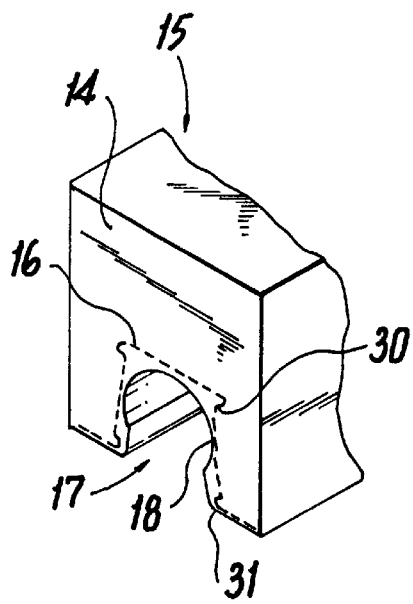
FIG. 5, in a perspective view corresponding to FIG. 2, a small portion of an elongate stator with a single slot, whose final form is obtained by lining the bundle of laminations with plastic.

By comparison, FIG. 5 shows an embodiment in which the slots 16, made by punching in the bundle 14 of laminations of an elongate stator 15 are given a cross-sectional form represented by a dashed line, while the slot 17 that is actually operative in the finished in the elongate stator 15 has a slot wall 18 that corresponds to the slot wall 6 in FIGS. 2–4. The slot wall 18 is produced by lining the slots 16 originally present, that is, those indicated by the dashed lines, with a plastic. This can be done for instance by positioning the bundle 14 of laminations as an insert part in an injection mold that has the cross-sectional shape of the final slots 17 in the region of the slots 16, and is then lined by means of an injection molding operation and also, if needed, sheathed completely. Producing the slot walls 18 in this way has the advantage above all that the stator laminations are provided in the critical regions with a comparatively thick plastic overlay, so that corrosion damage is reliably avoided. Instead of the injection molding, other processes for coating the bundle 14 of laminations with plastic may also be used, such as the pressure gelling method known as "reaction resin injecting molding".

One particular advantage of the bundle 14 of laminations of FIG. 5 also is that the form of the punched slots 16 can be chosen independently of the form of the actually operative slots 17. This makes it possible to select a form for the slots 16 that results in little trimming waste in punching and is optimally adapted to the electrical and/or magnetic conditions required in the operation of the linear motor. Any changes in the cross section and/or the outer shape of the conductors 3 can also be taken into account easily by correspondingly changing the forming tool, while the form of the slot 16, on which the design of other components of the linear motor, such as the magnets, sensors, linear generators or the like, also depends, can always remain unchanged. Finally, it is understood that the positional fixation of the conductors 3 according to the invention can be realized without having to change the previously conventional form of the slots 16.

Figure 6:
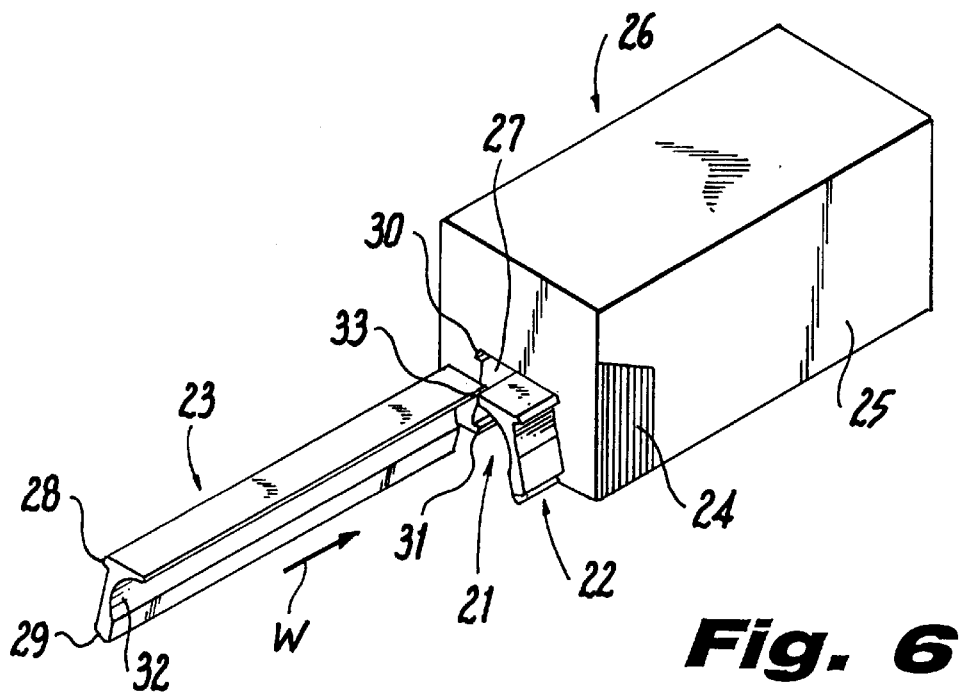
FIG. 6, in a perspective view corresponding to FIG. 2, a small portion of an elongate stator with a single slot, whose final form is obtained by inserted molded parts.

The advantages described in conjunction with FIG. 5 can also be attained with the exemplary embodiment of FIG. 6, in which the final form of the slots 21 is obtained with the aid of two mirror-symmetrically embodied mold parts 22, 23. A bundle 25 of laminations of an elongate stator 26, made of punched sheet-metal laminations 24, is provided with slots 27 whose inner contour corresponds to that of the slots 16 of FIG. 5. The two mold parts 22 and 23, which for instance comprise plastic injection molding parts, have a length corresponding to the length of the slots 27 and on each of their outer walls have respective upper, outward-protruding longitudinal protrusions 28 and lower longitudinal indentations 28 machined into the outer walls. These protrusions 28 and indentations 29 and the outer wall portions of the mold parts 22, 23 located between them are adapted precisely to corresponding upper longitudinal indentations 30 and lower longitudinal protrusions 31 (FIGS. 5, 6), respectively embodied in the walls of the slots 16 and 27, and to the wall portions located between them, so that they can be thrust into the slots 27 in their longitudinal direction or in the direction of an arrow w (FIG. 6) and after that are firmly seated nonrotatably therein. Moreover, the mold parts 22, 23 can be joined to the walls of the slots 27 by adhesive bonding, in order to fix them in the axial direction as well.

The inner walls 32 of the mold parts 22, 23 are mirror-symmetrical and are embodied such that in their state in which they are thrust into the slots 27 of the stator bundle 25 they correspond precisely to the form of the slot wall 18 (FIG. 5), abut one another in the upper region along a seam 33, and are open to the outside at the bottom through a slit. Because of their mirror symmetry, the mold parts 22, 23 can be made with the same injection molding tool.

Figure 7:
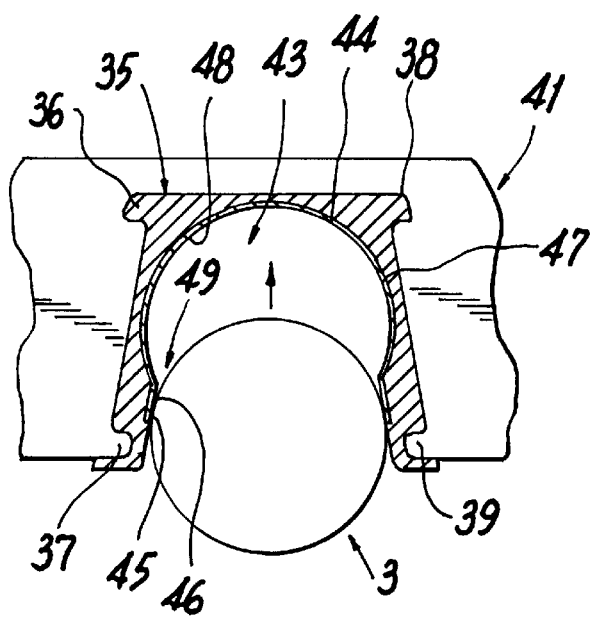
FIG. 7, a front view corresponding to FIG. 3 of a portion, having only a single slot, of an elongate stator in which the final slot form is defined by a metal shell placed in it.

FIG. 7, finally, shows an embodiment of the invention in which the two mold parts 22, 23 are united into a single mold part 35. The mold part 35 has longitudinal protrusions 36 and longitudinal indentations 37 in its outer wall region, which correspond with counterpart longitudinal indentations 38 and longitudinal protrusions 39, respectively, which are made in the slot wall 40 of a bundle 41 of laminations by suitable punching out of the individual laminations. As in the exemplary embodiment of FIG. 6, an inner wall of the mold part 35 defines a slot 43, whose wall 44 has a contour essentially corresponding to the contour of the walls 16 or 18.

In a departure from FIG. 6, the wall 44, near its outer, slitlike opening and on either side of it, has one bearing shoulder 45 each, extending longitudinally of the slot 42. Braced on these bearing shoulders 45 are two lower longitudinal edges 46 of a metal shell 47, which is made of a thin metal sheet shaped to match the wall 44. The metal sheet is preferably made from a spring-elastic material, so that the metal shell 47 can be pressed into the slot 43 in the direction of an arrow shown in FIG. 7 until its longitudinal edges 46 lock in detent fashion behind the bearing shoulders 45, as a result of which the metal shell 47 is fixed nonrotatably in the slot 43 and automatically can no longer fall out of it. In this case, the final winding 48 of the slot 43 and the minimum width of an outer slit 49 are therefore determined by the shape of the metal shell 47. However, the arrangement is preferably made such that the wall 44 of the mold part 35, in the region of the metal shell 47, has a cross section increased by the thickness of the metal shell, while the wall 48 has the same shape as the walls 6, 18 and 32.

In FIG. 7, a line 3 is also schematically shown, which can be pressed into the slot 43 in the direction of the arrow in the same way as described above with reference to FIGS. 2–4. The embodiment of FIG. 7 offers the advantage that the sheet 10 can be connected via the metal shell 47 to a ground line in a simple way (see German Patent Application 195 40 442.4). In terms of the positional fixation of the conductor 3 in the bundle 41 of laminations, there are no differences from the other exemplary embodiments.

Moreover, the mold part 35 can naturally also be used without the metal shell 47, if the bearing shoulders 45 are omitted and the cross section of the wall 44 is dimensioned accordingly.

The invention is not limited to the exemplary embodiments described, which can be modified in manifold ways. This is particularly true with respect to the inner contours of the walls 6, 18, 32 and 48, which are capable of numerous variations and can depend on the particular outer cross section of the lines 3 involved. Moreover, in the exemplary embodiments described that have slots open toward the bottom, the bearing faces 11 described in conjunction with FIGS. 2–4 are especially significant for the positional fixation of the lines 3, while the form of the upper halves of the slot walls can in principle also be designed arbitrarily differently and may for instance be polygonal or the like. It may also be advantageous to make the sheath 10 of the lines 3 from a slidable material, which would make it easier to press the lines 3 into the slots 2 etc through the slits 7, 49. Finally, the slits 7, at the places where they have the least width (FIG. 3), are bounded toward the outside expediently by wall parts 50 that widen in wedgelike fashion (FIGS. 3, 4), which serve as insertion bevels and again make it easier to press the lines 3 into place. Correspondingly, the metal shell 47 in the region of the longitudinal edges 46 may be bent radially outward from the narrowest point of the slit 49, if the bearing shoulder 45 are located below the least cross section, as is clearly visible in FIG. 7.

We claim:

1. An elongate stator for a linear motor comprising slots (2, 17, 43) and elastically deformable electric lines (3) to be fixed therein, said lines having outer diameters (d) and crosssectional forms and said slot having walls (6, 18, 32, 48) being opened to an outside through slits (7, 49) and being provided, in the region of said slits (7, 49), with bearing faces (11) adapted to said cross-sectional form of said lines, wherein said slits (7, 49) have narrowest point with a width less than the outer diameter (d) of said lines (3), and wherein said lines (3), because of their elastic deformability, can be pressed through said slits (7, 49) into said slots (2, 17, 43) and fixed therein.

2. The elongate stator of claim 1, characterized in that the slot walls (6, 18, 32, 48) extend over an arc of more than 180° and are adapted to the cross-sectional forms of the lines (3).

3. The elongate stator of one of claims 1, characterized in that it includes a bundle (4) of laminations composed of metal sheets (5), and the final form of the walls (6) of the slots (2) that have the lines (3) is obtained essentially by punching of the laminations (5).

4. The elongate stator of claims 1, characterized in that it includes a bundle (14) of laminations composed of metal sheets and having slots (16), and the final form of the walls (18) of the slots (17) receiving the lines is obtained by lining the slots (16), made by punching, with a plastic.

5. The elongate stator of claim 4, characterized in that the bundle (14) of laminations is entirely sheathed by a plastic.

6. The elongate stator of one of claims 1, characterized in that it includes a bundle (25, 41) of laminations composed of laminations (24) and having slots (27, 40), and the final form of the walls (32, 44) of the slots receiving the lines (3) is obtained by mold parts (22, 23; 35), which are inserted into the slots (27, 40) made by punching.

7. The elongate stator of claim 6, characterized in that the slots and mold parts (22, 23; 35) have, extending in their longitudinal direction, mating protrusions (28, 36) and indentations (29, 37) intended for insertion of the mold parts (22, 23; 35) into the slots (27, 40), by means of which protrusions and indentations the mold parts (22, 23; 35) are retained in the slots (27, 40) crosswise to the longitudinal direction by positive engagement.

8. The elongate stator of claim 6, characterized in that the mold parts (22, 23; 35) are firmly joined to the bundle (25, 41) of laminations by adhesive bonding.

9. The elongate stator of one of claims 1, characterized in that the final form of the walls (48) of the slots (43) receiving the lines (3) is obtained by metal shells (47) additionally inserted into slots of a bundle (41) of laminations.

10. The elongate stator of claim 9, characterized in that the slots of the bundle (41) of laminations are provided, in the region of the slits (49), with bearing shoulders (45) extending in the longitudinal direction of the slots, and the metal shells (47) have longitudinal edges (46) intended for bracing on the bearing shoulders (45).

11. A bundle of laminations for producing the elongate stator (1, 15, 26) of a linear motor, characterized in that it is embodied in accordance with one or more of the claims any one of claims 1 or 3–10.

* * * * *